(12) United States Patent
Wong et al.

(10) Patent No.: US 6,881,250 B2
(45) Date of Patent: Apr. 19, 2005

(54) TAILORED INK FOR PISTON DRIVEN ELECTROSTATIC LIQUID DROP MODULATOR

(75) Inventors: Raymond W. Wong, Mississauga (CA); Marcel P. Breton, Mississauga (CA); Christine E. Bedford, Toronto (CA); Leonard M. Carreira, Penfield, NY (US); Arthur M. Gooray, Penfield, NY (US); George J. Roller, Penfield, NY (US); Kevin Zavadil, Benalillo, NM (US); Paul Galambos, Albuquerque, NM (US); Joseph Crowley, Morgan Hill, CA (US)

(73) Assignees: Xerox Corporation, Stamford, CT (US); Sandia Corporation, Albuquerque, NM (US)

( * ) Notice: Subject to any disclaimer, the term of this patent is extended or adjusted under 35 U.S.C. 154(b) by 86 days.

(21) Appl. No.: 10/345,426

(22) Filed: Jan. 15, 2003

(65) Prior Publication Data

US 2004/0134379 A1 Jul. 15, 2004

(51) Int. Cl.$^7$ .............................................. C09D 11/00
(52) U.S. Cl. ................................ 106/31.25; 106/31.27; 106/31.32; 106/31.49; 106/31.58; 106/31.43; 106/31.59
(58) Field of Search ......................... 106/31.25, 31.27, 106/31.32, 31.49, 31.58, 31.43, 31.59

(56) References Cited

U.S. PATENT DOCUMENTS

| | | | | |
|---|---|---|---|---|
| 3,246,997 A | * | 4/1966 | Sumner et al. .......... | 106/31.26 |
| 5,226,957 A | * | 7/1993 | Wickramanayake et al. ..................... | 106/31.26 |
| 5,342,440 A | * | 8/1994 | Wickramanayake ..... | 106/31.43 |
| 5,492,559 A | | 2/1996 | Oliver et al. ............ | 106/31.25 |
| 5,551,973 A | | 9/1996 | Oliver et al. ............ | 106/31.25 |
| 5,643,357 A | | 7/1997 | Breton et al. ............ | 106/31.25 |
| 5,667,568 A | * | 9/1997 | Sacripante et al. ...... | 106/31.29 |
| 5,746,815 A | * | 5/1998 | Caputo .................... | 106/31.25 |
| 6,342,094 B1 | * | 1/2002 | Kabalnov ................ | 106/31.25 |
| 6,367,915 B1 | | 4/2002 | Gooray et al. ................ | 347/54 |
| 6,432,183 B1 | * | 8/2002 | Kabalnov ................ | 106/31.25 |
| 2003/0213402 A1 | * | 11/2003 | Magdassi et al. ........ | 106/31.25 |

* cited by examiner

Primary Examiner—Helene Klemanski
(74) Attorney, Agent, or Firm—Nixon Peabody LLP (57) ABSTRACT

The present invention relates to an ink composition including water, a solvent, a solvent-soluble dye, and a surfactant, where the ink exhibits a stable liquid microemulsion phase at a first temperature and a second temperature higher than the first temperature and has a conductivity of at most about 200 $\mu$S/cm and a dielectric constant of at least about 60, and methods of making such ink compositions. The present invention also relates to a method of making an ink composition for use in a microelectromechanical system-based fluid ejector. The method involves providing a solution or dispersion including a dye or a pigment and adding to the solution or dispersion an additive which includes a material that enhances dielectric permittivity and/or reduces conductivity under conditions effective to produce an ink composition having a conductivity of at most about 200 $\mu$S/cm and a dielectric constant of at least about 60.

24 Claims, 5 Drawing Sheets

TAILORED INK FOR PISTON DRIVEN ELECTROSTATIC LIQUID DROP MODULATOR

This invention was developed with governmental support under U.S. Department of Energy Contract No. DE-AC04-94AL85000. The U.S. Government may have certain rights in this invention.

FIELD OF THE INVENTION

The present invention relates to ink compositions for use in a piston-driven micromachined or microelectromechanical system (MEMS) based liquid drop modulator.

BACKGROUND

Liquid drop modulators have been developed for ink jet recording or printing. Ink jet printing systems offer numerous benefits, including extremely quiet operation when printing, high speed printing, a high degree of freedom in ink selection, and the ability to use low-cost plain paper. The so-called "drop-on-demand" drive method, where ink is output only when required for printing, is now the conventional approach. The drop-on-demand drive method makes it unnecessary to recover ink not needed for printing.

Liquid drop modulators for ink jet printing include one or more nozzles which allow the formation and control of small ink droplets to permit high resolution, resulting in the ability to print sharper characters with improved tonal resolution. In particular, drop-on-demand ink jet print heads are generally used for high resolution printers.

Drop-on-demand technology generally uses some type of pulse generator to form and eject drops. For example, in one type of print head, a chamber having an ink nozzle may be fitted with a piezoelectric wall that is deformed when a voltage is applied. As a result of the deformation, the fluid is forced out of the nozzle orifice as a drop. The drop then impinges directly on an associated printing surface. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies when printing directly to paper or alternative substrates. Drop-on-demand systems which use piezoelectric devices to expel the droplets also suffer the disadvantage of a slow printing speed.

Another type of print head uses bubbles formed by heat pulses to force fluid out of the nozzle. The drops are separated from the ink supply when the bubbles collapse. This type of droplet ejection system based upon thermally generated bubbles, commonly referred to as the "thermal ink jet" or "bubble jet" system, has high speed printing capability.

Yet another type of drop-on-demand print head incorporates an electrostatic actuator. This type of print head utilizes electrostatic force to eject the ink. Examples of such electrostatic print heads are disclosed in U.S. Pat. No. 4,520,375 to Kroll and Japanese Laid-Open Patent Publication No. 289351/90. In particular, U.S. Pat. No. 6,367,915 to Gooray et al. discloses electrostatically or magnetically driven piston structures whose movement ejects a drop or droplet of fluid.

While there are many ink compositions known to be suitable for use with piezoelectric devices or bubble jet device, a need remains for ink compositions suitable for use with electrostatic liquid drop modulator devices such as those disclosed in U.S. Pat. No. 6,367,915 to Gooray et al. Electrostatic liquid drop modulation requires a fluid that possesses very specific dielectric properties. For electrostatic actuation, the maximum force is realized at a maximum product of field and dielectric constant. High field requires a high dielectric strength (high breakdown voltage) in the fluid. The fluid must exhibit a sufficiently low electrolytic decomposition rate to support a stable field. A fluid must also possess a low conductivity to minimize power losses due to the migration of ions to the electrodes and maximize energy efficiency of the device. The use of non-ideal conductors raises the possibility of capacitively coupling of the field to solution and the need for low conductivity in the fluid to ensure sufficiently long field relaxation times. For neat fluids, conductivity generally scales with dielectric constant, demonstrating that simple solvent selection is not enough to guarantee a fluid with optimum properties. Additions of solvent and solute impact both the dielectric constant and the conductivity. Appreciable solvent and solute create a media of mixed dipoles, reduces hydrogen bonding in water and may generate a greater concentration of mobile ion, often resulting in decreases in dielectric constant.

Specifically, the piston driven microelectromechanical system (MEMS) based liquid drop ejector technology requires ink with special electrical properties. The ink needs to satisfy the low conductivity of less than 200 microS/cm and high dielectric constant greater than 60. Purified deionized water can satisfy the requirements. However, the addition of water soluble dye to the deionized water will increase the conductivity of the ink to well above 200 microS/cm. An oil based ink (or hydrocarbon based ink) will have low conductivity below 200 microS/cm and low dielectric constant below 10. The addition of colorants to the oil, e.g. oil soluble dyes, can satisfy the low conductivity requirements, but cannot satisfy the high dielectric constant requirements. Therefore, aqueous inks with water soluble dyes or oil based ink with oil soluble dyes cannot satisfy the piston-MEMS ink requirements.

The present invention is directed to overcoming these deficiencies in the art.

SUMMARY

The present invention relates to an ink composition including water, a solvent, a solvent-soluble dye, and a surfactant, where the ink exhibits a stable liquid microemulsion phase at a first temperature and a second temperature higher than the first temperature and has a conductivity of at most about 200 $\mu$S/cm and a dielectric constant of at least about 60.

Another aspect of the present invention relates to a method of making an ink composition for use in a microelectromechanical system-based fluid ejector. The method includes providing a solution including a solvent, a solvent-soluble dye, and a surfactant. Then, the solution is added to water under conditions effective to produce an ink composition which exhibits a stable liquid microemulsion phase at a first temperature and a second temperature higher than the first temperature and has a conductivity of at most about 200 $\mu$S/cm and a dielectric constant of at least about 60.

The present invention also relates to a method of making an ink composition for use in a microelectromechanical system-based fluid ejector. The method involves providing a solution or dispersion containing a dye or a pigment and adding to the solution or dispersion an additive which includes a material that enhances dielectric permittivity and/or reduces conductivity under conditions effective to produce an ink composition having a conductivity of at most about 200 µS/cm and a dielectric constant of at least about 60.

BRIEF DESCRIPTION OF THE DRAWINGS

FIGS. 2A–C illustrate phase diagrams for different microemulsion systems at room temperature (22° C.).

FIGS. 3A–C illustrate phase diagrams for different microemulsion systems at 60° C.

FIGS. 4A–C illustrate phase diagrams for different microemulsion systems at room temperature (22° C.).

DETAILED DESCRIPTION

The inks of the present invention are developed to match the needs of electrostatic actuation. Specifically, the ink compositions of the present invention which are useful for piston driven microelectromechanical system (MEMS) based liquid drop ejector technology have a conductivity of less than 200 µS/cm and a dielectric constant greater than 60. In addition, the ink compositions of the present invention have a low viscosity of less than 10 cPs, more specifically, less than 5 cPs, and a surface tension of from about 25 to about 55 mN/m, more specifically, from about 30 to about 45 mN/m.

The present invention relates to an ink composition including water, a solvent, a solvent-soluble dye, and a surfactant, where the ink exhibits a stable liquid microemulsion phase at a first temperature and a second temperature higher than the first temperature and has a conductivity of at most about 200 µS/cm and a dielectric constant of at least about 60. In one embodiment of the present invention, the ink has a conductivity of at most about 150 µS/cm. In another embodiment of the present invention, the ink has a conductivity of at most about 10 µS/cm and a dielectric constant of at least about 70. An emulsion is defined as a dispersion of oil/solvent in water or water in oil/solvent with the dispersion being stabilized by a surfactant. A "microemulsion" is a thermodynamically stable dispersion of one liquid phase into another, stabilized by an interfacial film of surfactant. The dispersion may be either oil-in-water or water-in-oil. Essentially, a microemulsion is an emulsifiable concentrate diluted with water and the appropriate type and amount of surfactant, such that the emulsified oil droplets are, typically, too small to be visible. To the naked eye, a perfect microemulsion is a clear solution indistinguishable from an aqueous solution. Typically, the microemulsion droplet diameter is approximately 100 nanometers or less. The interfacial tension between the two phases is extremely low. Microemulsions are two phase systems, whereas micellar solutions are a colloidal aggregate of surfactant molecules that occur at a well-defined low concentration of surfactant and may be considered one phase. The ink of the present invention can include micellar solutions. In contrast, emulsions (or macroemulsions) are unstable, where the suspended droplets will eventually agglomerate and the dispersed phase will phase separate. Emulsion droplet sizes are much larger, typically one micron or more, resulting in a cloudy or milky dispersion. The nature of an emulsion may depend on the order of mixing of the ingredients and the amount of energy put into the mixing process, whereas, in microemulsions, the final microemulsion state will not depend on the order of mixing and energy input only determines the time it will take to reach the equilibrium state. Microemulsion ink compositions have been disclosed in U.S. Pat. No. 5,492,559 to Oliver et al., issued Feb. 20, 1996, U.S. Pat. No. 5,551,973 to Oliver et al., issued Sep. 3, 1996, and U.S. Pat. No. 5,643,357 to Breton et al., issued Jul. 1, 1997, which are hereby incorporated by reference in their entirety.

The present invention also relates to a method of making an ink composition for use in a microelectromechanical system-based fluid ejector. The method includes providing a solution containing a solvent, a solvent-soluble dye, and a surfactant. Then, the solution is added to water under conditions effective to produce an ink composition which exhibits a stable liquid microemulsion phase at a first temperature and a second temperature higher than the first temperature and has a conductivity of at most about 200 µS/cm and a dielectric constant of at least about 60. Specifically, the solvent-soluble dye can be dissolved in the solvent and the surfactant at 60° C. for an hour with stirring inside a beaker. Then, the solvent-soluble dye-solvent-surfactant mixture can be added dropwise at 60° C. to a sonified deionized water solution. The resulting microemulsion ink can be then sonified for 10 minutes with temperature maintained at around 60° C.

Figure 1:
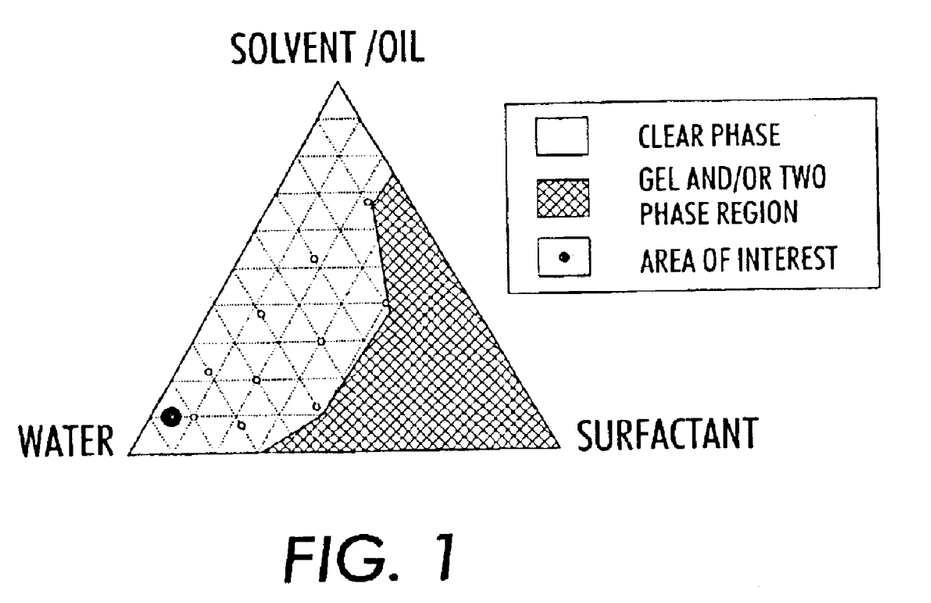
FIG. 1 is a representative phase diagram for a water-solvent/oil-surfactant microemulsion system which identifies a one-phase isotropic region as well as a two-phase region.

Phase diagrams of different microemulsion systems of the present invention such as the representative phase diagram shown in FIG. 1 are constructed to identify one phase isotropic regions. The isotropic regions for each water/solvent/surfactant composition at different temperatures are maintained to prevent phase separating of the system at the operating temperature. Typically, the ink composition of the present invention exhibits a stable liquid microemulsion phase at a first temperature of about 22° C. and a second temperature of about 60° C., as well as at any temperature between about 22° C. and about 60° C. Specifically, the ink composition of the present invention exhibits a stable liquid microemulsion phase at a first temperature of about 22° C. and a second temperature of about 50° C. More specifically, the ink composition of the present invention exhibits a stable liquid microemulsion phase at a first temperature of about 22° C. and a second temperature of about 35° C.

The water of the ink composition of the present invention is typically purified deionized water that has a high dielectric constant (78.3 at 25° C.) and low conductivity (0.4 µS/cm). In one embodiment of the present invention, the water in the ink composition is present in an amount of from about 60 to about 95 percent by weight. More specifically, the water in the ink composition of the present invention is present in an amount of from about 70 to about 85 percent by weight. Water at too low a concentration can lower the dielectric constant.

Solvents with high dielectric constants and strong solvency for the dyes are selected for the ink composition of the present invention. In addition, solvents with high water solubility are selected to avoid phase separation. Examples of solvents include 1-methyl-2-pyrrolidinone (dielectric constant 32.5), propylene carbonate (dielectric constant 66.14), ethylene carbonate (dielectric constant 89.7), N-acetylethanolamide (dielectric constant 96.6), N-ethylformamide (dielectric constant 102), N-butylacetamide (dielectric constant 104), formamide (dielectric constant 111), N-propylpropanamide (dielectric constant 118), N-ethylacetamide (dielectric constant 135), N-methylpropanamide (dielectric constant 170), and N-methylformamide (dielectric constant 189). In one advantageous embodiment of the present invention, 1-methyl-2-pyrrolidinone is disclosed.

In another embodiment of the present invention, the solvent in the ink composition is present in an amount of from about 2 to about 30 percent by weight. More specifically, the solvent in the ink composition is present in an amount of from about 2 to about 10 percent by weight. A solvent at too high a concentration can lower the dielectric constant and increase the conductivity.

Surfactants with HLB (Hydrophile-Lipophile Balance) values of from about 8 to about 19 are selected for the present invention, because surfactants with lower HLB values result in gels or precipitates. Examples of surfactants include polyoxyethylene alkyl ether, ethoxylated alkyl phenol, propyleneoxide-b-ethylene oxide, or polyethylene glycol with secondary alcohols. More specifically, examples of polyoxyethylene alkyl ether surfactants include Brij 30 (ICI Americas, Inc., Wilmington, Del.), Brij 35 (ICI Americas, Inc.), Brij 76 (ICI Americas, Inc.), and Brij 78 (ICI Americas, Inc.). Examples of ethoxylated alkyl phenol surfactants include Igepal DM970 (Rhone-Poulenc, Cranbury, N.J.), Igepal CO990 (Rhone-PoulencJ), and Igepal CA720 (Rhone-Poulenc). Examples of propyleneoxide-b-ethylene oxide surfactants include Pluronic P104 (BASF, Mount Olive, N.J.), Pluronic 10R-5 (BASF), and Pluronic L64 (BASF). Examples of polyethylene glycol with secondary alcohol surfactants include Tergitol 15S15 (Union Carbide, Danbury, Conn.), Tergitol 15S20 (Union Carbide), and Tergitol 15S30 (Union Carbide). Mixtures of these surfactants can also be used in the ink composition of the present invention.

In another embodiment of the present invention, the surfactant is present in an amount of from about 1 to about 10 percent by weight. The surfactant at too high a concentration can increase the viscosity of the ink.

Dyes with good solubility in the solvent but poor solubility in the water are selected. In another embodiment of the present invention, the solvent-soluble dye is present in an amount of from about 1 to about 10 percent by weight. Examples of solvent-soluble dyes include Neopen Blue 807 (BASF), Savinyl Black NS (Clariant, Charlotte, N.C.), and Solvent Yellow 030 (Spectra, Kearny, N.J.). Other dyes having similar solubility parameters can also be used.

In addition to water, the solvent, the dye, and the surfactant, the ink composition of the present invention can also contain a humectant and/or other additives. Examples of humectants include tetramethylene sulfone, ethylene glycol, diethylene glycol, glycerol, 1-methyl-2-pyrrolidinone, propylene carbonate, ethylene carbonate, pentanol, benzyl alcohol, 1,2-pentanediol, 1,5-pentanediol, and other higher molecular weight diols and polyols.

In one advantageous embodiment of the present invention, the water, the solvent, and the surfactant are present in relative amounts of about 85 percent by weight water, about 10 percent by weight solvent, and about 5 percent by weight surfactant.

In another advantageous embodiment of the present invention, the ink composition can further include a humectant and the water, the solvent, the surfactant, and the humectant are present in relative amounts of about 80 percent by weight water, about 10 percent by weight solvent, about 5 percent by weight surfactant, and about 5 percent by weight humectant.

The present invention also relates to a method of making an ink composition for use in a microelectromechanical system-based fluid ejector. The method involves providing a solution or dispersion including a dye or a pigment and adding to the solution or dispersion an additive which includes a material that enhances dielectric permittivity and/or reduces conductivity under conditions effective to produce an ink composition having a conductivity of at most about 200 $\mu$S/cm and a dielectric constant of at least about 60.

Selective additives, in the form of co-solvents and solutes, can be used to produce artificial dielectric properties to increase the high voltage breakdown threshold of the ink compositions, decrease the electrolytic decomposition susceptibility, and increase the dielectric constant and minimize conductivity.

The additive added to the ink composition of the present invention can be a co-solvent. Co-solvents that have high dielectric constant and low conductivity are selected. Suitable co-solvents include ethylene glycol, diethylene glycol, glycerol, 1-methyl-2-pyrrolidinone, propylene carbonate, ethylene carbonate, N-acetylethanolamide, N-ethylformamide, N-butylacetamide, formamide, N-propylpropanamide, N-ethylacetamide, N-methylpropanamide, and N-methylformamide.

The additive added to the ink composition of the present invention can also be in the form of particles. The particles can be in surface-grafted or ungrafted forms. Suitable material for the particles include latex, titanium dioxide, alumina, and silica. For example, latex particles of sizes ranging from about 0.01 to about 1 micron can be added. Latex particles can be stabilized with a non-ionic surfactant. The impact of the latex is to enhance the dielectric strength of the fluid as measured by the maximum field necessary for breakdown. The latex also aids in the dry properties of the ink resulting in improved print quality and better smear resistance.

When the solution or dispersion including a dye or a pigment is aqueous, additives such as zwitterionic biological buffers or peptides can be used to increase dielectric permittivity. Examples of buffers include cyclohexylaminopropanesulfonic acid (CAPS), hydroxyethylpiperazine ethanesulfonic acid (HEPES), and hydroxyethylpiperazine propanesulfonic acid (HEPPS). Examples of peptides include diglycine and triglycine. These types of aqueous ink compositions with dielectric enhancement require semi conductive coatings on the electrodes of the fluid ejector. The coatings must also be compatible with the ink's aggressive characteristics. These ink compositions offer very good print quality latitude on plain papers.

The pigment of the ink composition of the present invention includes carbon black and color pigments. Examples of carbon black pigments include channel black, furnace black, lamp black, and the like. Examples of colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index (The Society of Dyers and Colourists, United Kindom) as CI 60710, CI Dispersed Red 15, a diazo dye identified in the Color Index as CI 26050, CI Solvent Red 19, and the like. Illustrative examples of suitable cyan pigments include copper tetra-4-(octadecylsulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company (Marietta, Ga.), Regal® 330, Black Pearl® L, Black Pearl® 1300, and other similar carbon black products available from Cabot Company (Bellerica, Mass.), Degussa carbon blacks such as Color Black® series, Special Black® series, Printtex® series, and Derussol® carbon black dispersions available from Degussa Company (Bridgeport, N.J.), Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp. (Charlotte, N.C.), Normandy Magenta RD-2400 (Magruder, Elizabeth, N.J.), Paliogen Violet 5100 (BASF), Paliogen Violet 5890 (BASF), Permanent Violet VT2645 (Magruder), Heliogen Green L8730 (BASF), Argyle Green XP-111-S (Magruder), Brilliant Green Toner GR 0991 (Magruder), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba Specialties Chemicals, Tarrytown, N.Y.), Paliogen Blue 6470 (BASF), Sudan III (Matheson, Coleman, Bell, Norwood, Ohio), Sudan II (Matheson, Coleman, Bell), Sudan IV (Matheson, Coleman, Bell), Sudan Orange 6 (Aldrich, St. Louis, Mo.), Sudan Orange G (Aldrich), Sudan Orange 220 (BASF), Paliogen Orange 3040 (BASF), Ortho Orange OR 2673 (Magruder), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp.), Permanent Yellow YE 0305 (Magruder), Lumogen Yellow D0790 (BASF), Suco-Gelb L1250 (BASF), Suco-Yellow D1355 (BASF), Hostaperm Pink E (Clariant Corp.), Fanal Pink D4830 (BASF), Cinquasia Magenta (Ciba Specialties Chemicals), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Magruder), Lithol Scarlet 4440 (BASF), Bon Red C (Dominion Color Company of Canada), Royal Brilliant Red RD-8192 (Magruder), Oracet Pink RF (Ciba Specialties Chemicals), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink4810, Luconyl Blue 7050, and the like. Other pigments can also be selected.

Advantageously, embodiments include the pigment particle size being as small as possible to enable a stable colloidal suspension of the particles in the liquid vehicle and to prevent clogging of the ink channels when the ink is used in the printer. Specifically, particle average diameters are generally from about 0.001 to about 5 microns, and more preferably from about 0.1 to about 1 micron, although the particle size can be outside these ranges. The ink compositions of the present invention can have the pigment present in any effective amount to achieve the desired degree of coloration. Specifically, the pigment is present in an amount of from about 0.1 to about 8 percent by weight of the ink, and more specifically from about 2 to about 7 percent by weight of the ink, although the amount can be outside these ranges.

Examples of various additives that can be included in the ink composition of the present invention to address the drop ejector requirements such as latency, recoverability, or print quality, and drying, include surfactants, humectants, penetrants, dispersants, biocides, or fixatives. With respect to the surfactants, a non-ionic surfactant or a mixture of non-ionic surfactants can be used. Additives that enhance dielectric permittivity and/or reduce conductivity can be present in the ink composition of the present invention in an amount from about 0.05 to about 25 percent by weight. Table 1 illustrates the typical ranges of weight percentages of different components in a water-based ink composition of the present invention with a dielectric enhancer added.

TABLE 1

Water Based Ink (Dye/Pigment)

| Components | Typical Weight Percent (range) |
|---|---|
| Colorant | 2–12 |
| Vehicle (water) | 40–90 |
| Humectant | 5–50 |
| Penetrant | 1–5 |
| Surfactant | 0.001–1 |
| Dispersant/Solubilizer | 0.5–1 |
| Biocide | 0.05–1 |
| Binder/Fixative | 1–10 |
| Dielectric enhancer | 0.05–25 |

When the solution or dispersion including a dye or a pigment is non-aqueous, additives can also be used to increase dielectric permittivity. Examples of additives include lecithin (monoaminophosphatide), lanolin, or linolenic acid. These types of oil (hydrocarbon) based inks with dielectric enhancement do not require coated parts. However, good print quality might be best achieved on coated papers or in transfix type of printing where the image is formed on an intermediate substrate from which excess vehicle can be removed prior to image transfer to paper. Although such inks would generally be pigment-based, dye-based compositions having dyes soluble in a more viscous or less volatile ink vehicle component could be formulated so that the colorant could be separated and concentrated away from the major liquid ink component.

In addition, modified thermal ink jet ink compositions—aqueous or solvent based—which are optimized for the MEMS electrostatic liquid drop modulator can be formulated with dielectric enhancement additives and conductivity reduction.

Specific embodiments of the invention is described in the following examples. The examples are intended to be illustrative, and the invention is not limited to the materials, conditions, or process parameters set forth in these embodiments.

EXAMPLES

Example 1

Ink compositions of the present invention with the following ingredients (by weight) were prepared by dissolving the solvent dye in the solvent and the surfactant at 60° C. for an hour with stirring inside a beaker, followed by adding the soluble dye-solvent-surfactant mixed solution dropwise at 60° C. to a sonified deionized water solution, and sonifying the resulting microemulsion ink for 10 minutes with temperature maintained at around 60° C.:

Ink 1:
- 80 g   Water
- 10 g   Solvent (1-methyl-2-pyrrolidinone)
- 5 g    Surfactant (Brij 35)
- 2 g    Dye (Neopen Blue 807)

Ink 2:
- 80 g   Water
- 10 g   Solvent (1-methyl-2-pyrrolidinone)
- 5 g    Surfactant (Igepal DM 970)
- 2 g    Dye (Neopen Blue 807)

Ink 3:
- 80 g   Water
- 10 g   Solvent (1-methyl-2-pyrrolidinone)
- 5 g    Surfactant (Pluronic P104)
- 2 g    Dye (Neopen Blue 807)

Figure 2A:
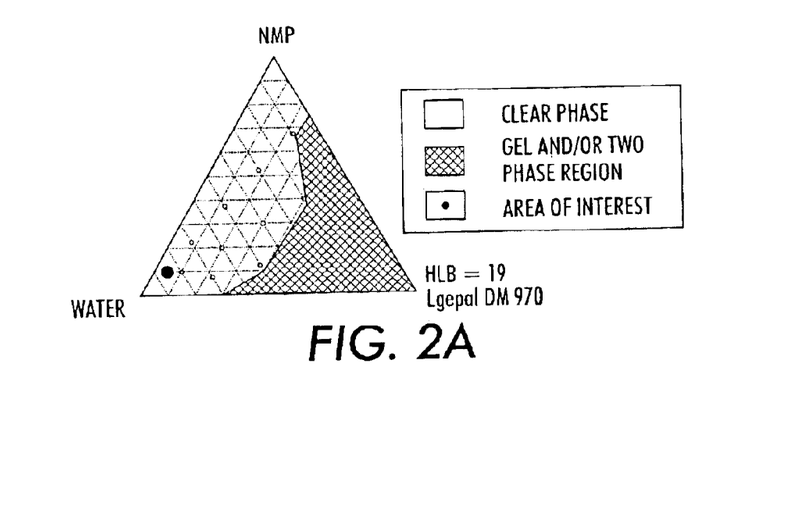
FIG. 2A shows a water/NMP/Igepal DM 970 microemulsion system.
Figure 2B:
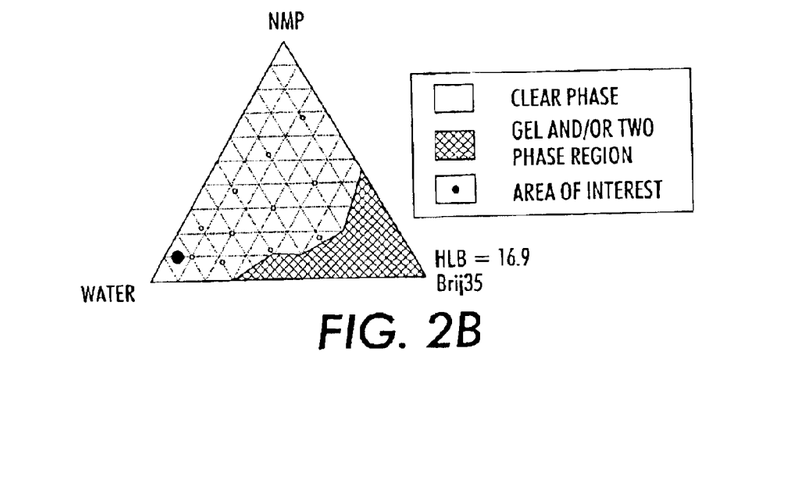
FIG. 2B shows a water/NMP/Brij 35 microemulsion system.
Figure 2C:
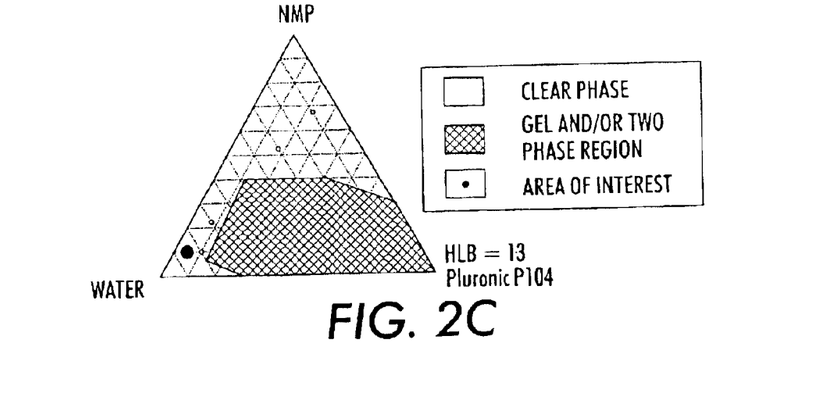
FIG. 2C shows a water/NMP/Pluronic P104 microemulsion system.
Figure 3A:
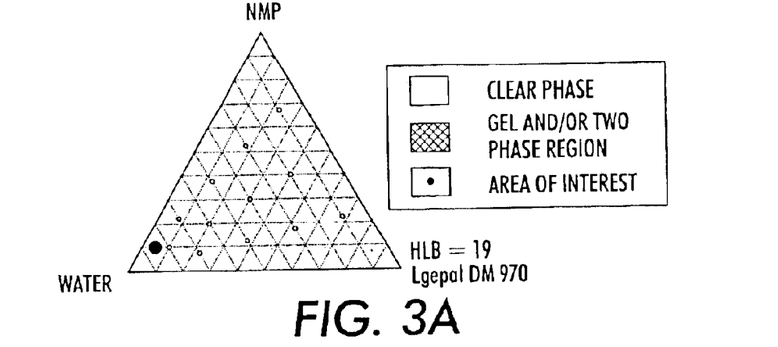
FIG. 3A shows a water/NMP/Igepal DM 970 microemulsion system.
Figure 3B:
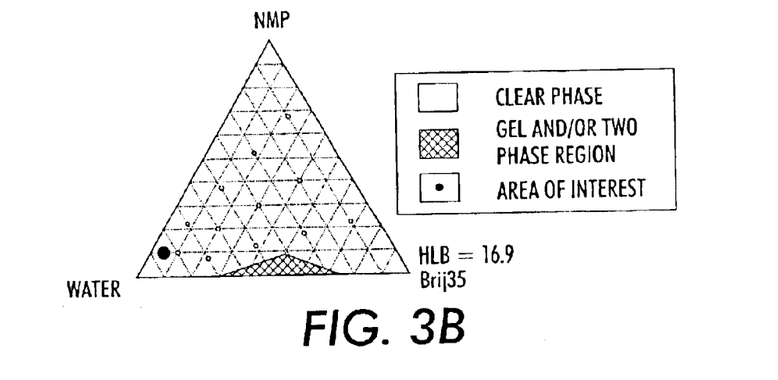
FIG. 3B shows a water/NMP/Brij 35 microemulsion system.
Figure 3C:
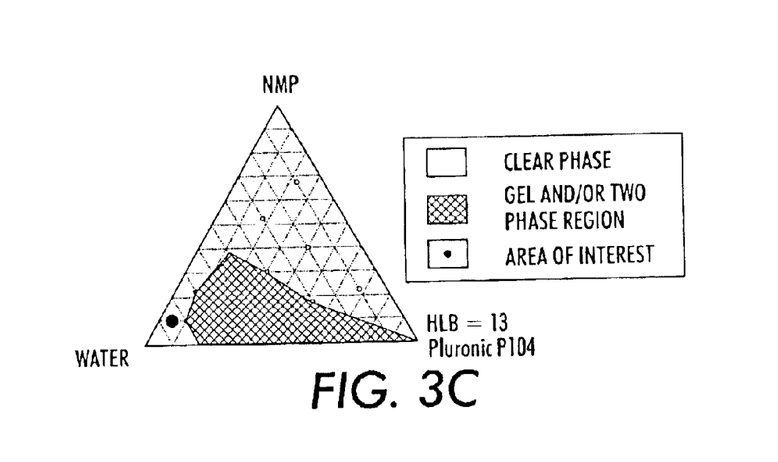
FIG. 3C shows a water/NMP/Pluronic P104 microemulsion system.

Phase diagrams for Ink 1 at two different temperatures—room temperature (22° C.) and 60° C.—are shown in FIGS. 2A and 3A, respectively. Phase diagrams for Ink 2 at two different temperatures—room temperature and 60° C.—are shown in FIGS. 2B and 3B, respectively. Phase diagrams for Ink 3 at two different temperatures—room temperature and 60° C.—are shown in FIGS. 2C and 3C, respectively.

The prepared microemulsion ink compositions (Ink 1, Ink 2, and Ink 3) had dielectric constants of 70–72, conductivities of 90–149 µS/cm, viscosities of 2.0 to 5 cps, and surface tensions of 34–36 dyne/cm². Thus, the oil-in-water microemulsion ink compositions satisfied the physical properties of the piston-MEMS ink requirements and, thus, were expected to show good print qualities using a piston-MEMS printer. Print tests of the ink on a Hewlett-Packard thermal ink jet printer showed good image quality with excellent waterfastness properties. An additional humectant, e.g. 5 g sulfolane, can also be added together with the surfactants in the microemulsion ink compositions to satisfy the piston-MEMS requirements.

Example 2

Ink compositions of the present invention with the following ingredients (by weight) were prepared by dissolving the solvent dye in the solvent and the surfactant at 60° C. for an hour with stirring inside a beaker, followed by adding the soluble dye-solvent-surfactant mixed solution dropwise at 60° C. to a sonified deionized water solution, and sonifying the resulting microemulsion ink for 10 minutes with temperature maintained at around 60° C.:

Ink 4:
- 85 g   Water
- 10 g   Solvent (1-methyl-2-pyrrolidinone)
- 5 g    Surfactant (Brij 30)
- 2 g    Dye (Neopen Blue 807)

Ink 5:
- 85 g   Water
- 10 g   Solvent (1-methyl-2-pyrrolidinone)
- 5 g    Surfactant (Igepal CO 990)
- 2 g    Dye (Neopen Blue 807)

Ink 6:
- 85 g   Water
- 10 g   Solvent (1-methyl-2-pyrrolidinone)
- 5 g    Surfactant (Brij 78)
- 2 g    Dye (Neopen Blue 807)

Figure 4A:
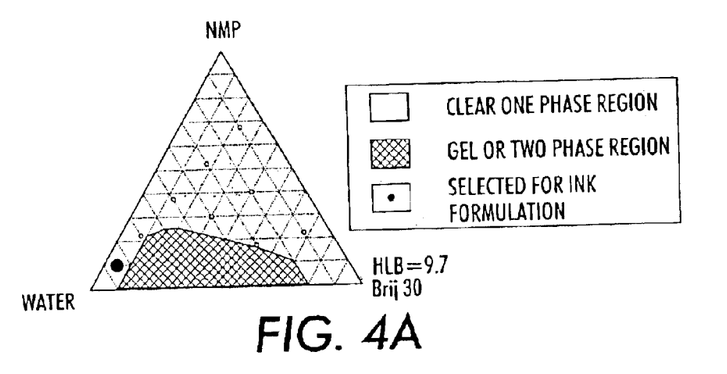
FIG. 4A shows a water/NMP/Brij 30 microemulsion system.
Figure 4B:
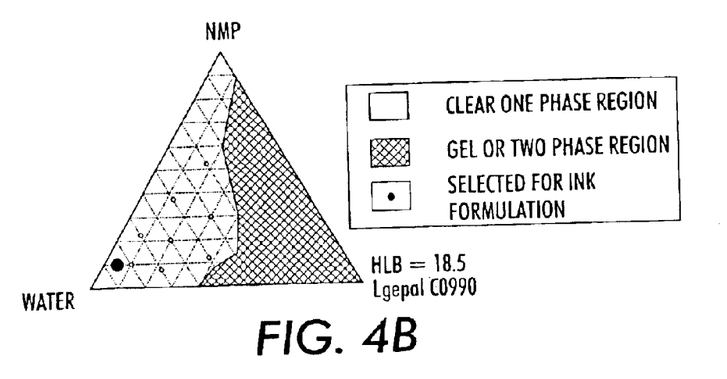
FIG. 4B shows a water/NMP/Igepal CO 990 microemulsion system.
Figure 4C:
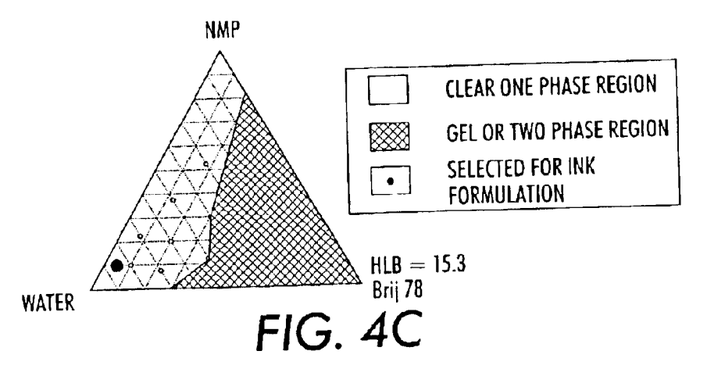
FIG. 4C shows a water/NMP/Brij 78 microemulsion system.

Phase diagrams for Ink 4, Ink 5, and Ink 6 at room temperature (22° C.) are shown in FIGS. 4A, 4B and 4C, respectively.

The prepared microemulsion ink composition of Ink 6, for example, had a dielectric constant of 70.7, conductivity of 107.2 µS/cm, viscosity of 2.2 cps, and surface tensions of 37.5 dyne/cm². Thus, the microemulsion ink composition satisfied the physical properties of the piston-MEMS ink requirements and, thus, were expected to show good print qualities using a piston-MEMS printer. Print tests of the ink on a Hewlett-Packard thermal ink jet printer showed good image quality with excellent waterfastness properties.

Example 3

In order to develop ink compositions suitable for use in a piston driven microelectromechanical system (MEMS) based liquid drop ejector, i.e., ink compositions that have a conductivity of less than 200 µS/cm and a dielectric constant greater than 60, the conductivities and dielectric constants of different types of ink compositions with different dye or pigment concentrations were measured. As shown in Table 2, a normal aqueous dye based ink such as the R series (R-1 to R-5) having different concentrations of dye, Duasyn Acid Blue AE-SF VP344, did not satisfy the ink conductivity requirement at dye concentrations of more than 0.1% (see R-4 and R-5). Even though the dielectric constants were similar, the R series exhibited very high conductivity at 1% dye loading (see R-5), since the dye increases the conductivity of the medium. A special carbon black ink dispersion from Cabot, such as the C series (C-1 to C-3), having different concentrations of pigment, IJX 59, also did not satisfy the ink conductivity requirements, as shown in Table 2. (The dielectric constants were not measured due to the high conductivity.)

TABLE 2

| Ink | % Dye | Conductivity (21° C., µS/cm) | Dielectric Constant (23° C., 100 MHz) | Comment |
|---|---|---|---|---|
| R-1 | 0.005 | 20.7 | 79.4 | Dye in water |
| R-2 | 0.01 | 29.6 | 79.2 | Dye in water |
| R-3 | 0.05 | 115 | 79.6 | Dye in water |
| R-4 | 0.1 | 216 | 79.8 | Dye in water |
| R-5 | 1.0 | 2000 | | Dye in water |
| C-1 | 0 | 8.7 | | Pigment IJX59 in water |

TABLE 2-continued

| Ink | % Dye | Conductivity (21° C., μS/cm) | Dielectric Constant (23° C., 100 MHz) | Comment |
|-----|-------|------------------------------|----------------------------------------|---------|
| C-2 | 0.5 | 488 | | Pigment IJX59 in water |
| C-3 | 1 | 890 | | Pigment IJX59 in water |
| B-1 | 0.5 | 62. | 80.9 | Pigment in water |
| B-2 | 2.2 | 179 | 84.7 | Pigment in water |
| B-3 | 3.2 | 314 | 87.3 | Pigment in water |
| B-4 | 5 | 456 | 91 | Pigment in water |
| B-5 | 2.2 | 108 | 78.1 | Pigment in water with 30% EG/DEG (50/50) |
| B-6 | 2.2 | 115 | 74.8 | Pigment in water with 30% glycerol |
| B-7 | 2.2 | 197 | 84.7 | Pigment in water with 20% N-ethylacetamide |

In contrast, as shown in Table 2, a specially surface treated carbon black pigment dispersion from Degussa, such as the B series (B-1 to B-7), having different concentrations of pigment, IDIS 18.1, at around 2% loading dispersed in an aqueous medium (see B-2) did satisfy the ink's conductivity and dielectric constant requirements. The aqueous ink compositions mixed with co-solvents like ethylene glycol, diethylene glycol, glycerol, or N-ethyl acetamide also exhibited high dielectric permittivity but low conductivity (see Table 2, B-5 to B-7). A specially surface treated carbon black pigment dispersion from Degussa, having pigment, IDIS 15, was also found to satisfy the ink's conductivity and dielectric constant requirements.

Figure 5:
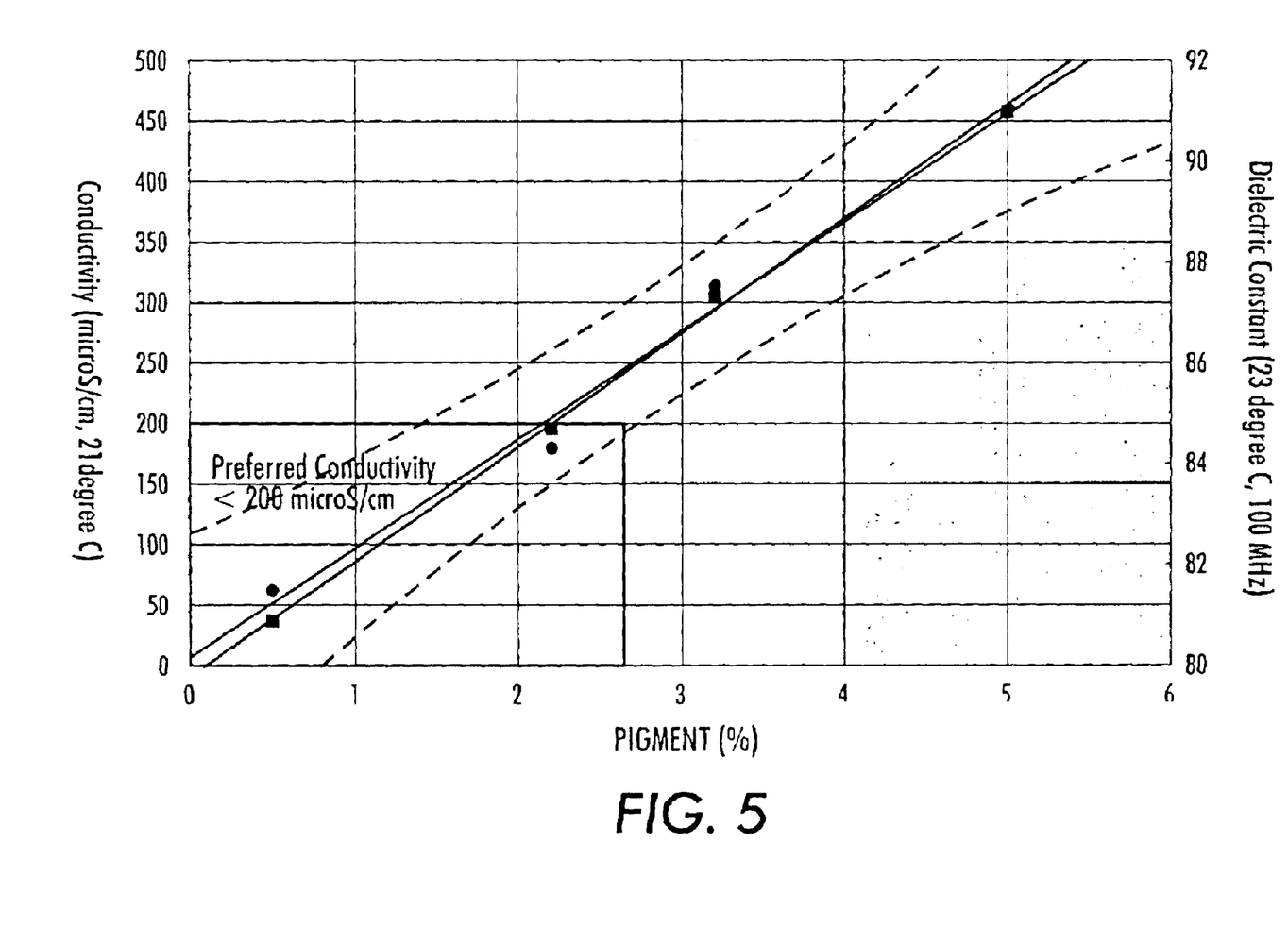
FIG. 5 shows the effect of carbon black loading on ink conductivity (●) and dielectric constant (■). Conductivity= $8.3846+89.7212*x$; Dielectric Constant=$79.8154+2.2604*x$. Dotted lines on the graph represent 95% confidence level of prediction.

When carbon black is put into a water base, black pigmented inks are generated. The graphite particles are suspended by surfactants. The particle surfaces are modified by grafting ionic functionalities to the surface in the form of organosulfates, amides, and carboxylates. FIG. 5 shows the effect of carbon black loading on ink conductivity and dielectric constant. The carbon black contributed only modestly to conductivity increases, while significantly raising the dielectric constant well above the value of 78 for water.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed:

1. An ink composition comprising water, a solvent, a solvent-soluble dye, and a surfactant, wherein said ink exhibits a stable liquid microemulsion phase at a first temperature and a second temperature higher than the first temperature, wherein the first temperature is about 22° C. and the second temperature is between about 22° C. and about 60° C., and has a conductivity of at most about 200 μS/cm and a dielectric constant of at least about 60.

2. An ink composition according to claim 1, wherein said ink has a conductivity of at most about 10 μS/cm and a dielectric constant of at least about 70.

3. An ink composition according to claim 1, wherein the first temperature is about 22° C. and the second temperature is about 60° C.

4. An ink composition according to claim 1, wherein the solvent has a high dielectric constant and is selected from the group consisting of 1-methyl-2-pyrrolidinone, propylene carbonate, ethylene carbonate, N-acetylethanolamide, N-ethylformamide, N-butylacetamide, formamide, N-propylpropanamide, N-ethylacetaniide, N-methylpropanamide, and N-methylformamide.

5. An ink composition according to claim 4, wherein the solvent is 1-methyl-2-pyrrolidinone.

6. An ink composition according to claim 1, wherein the surfactant has an Hydrophile-Lipophile Balance (HLB) value of from about 8 to about 19.

7. An ink composition according to claim 1 wherein the surfactant is selected from the group consisting of a polyoxyethylene alkyl ether, an ethoxylated alkyl phenol, a propyleneoxide-b-ethylene oxide, and a polyethylene glycol with secondary alcohols.

8. An ink composition according to claim 1 further comprising a humectant selected from the group consisting of tetramethylene sulfone, ethylene glycol, diethylene glycol, glycerol, 1-methyl-2-pyrrolidinone, propylene carbonate, ethylene carbonate, pentanol, benzyl alcohol, 1,2-pentanediol, 1,5-pentanediol, and high molecular weight diols and polyols.

9. An ink composition according to claim 1, wherein the water is present in an amount of from about 60 to about 95 percent by weight.

10. An ink composition according to claim 1, wherein the solvent is present in an amount of from about 2 to about 10 percent by weight.

11. An ink composition according to claim 1, wherein the surfactant is present in an amount of from about 1 to about 10 percent by weight.

12. An ink composition according to claim 1, wherein the solvent-soluble dye is present in an amount of from about 1 to about 10 percent by weight.

13. An ink composition according to claim 1, wherein the water, the solvent, and the surfactant are present in relative amounts of about 85 percent by weight water, about 10 percent by weight solvent, and about 5 percent by weight surfactant.

14. An ink composition according to claim 1, wherein the ink composition further comprises a humectant and the water, the solvent, the surfactant, and the humectant are present in relative amounts of about 80 percent by weight water, about 10 percent by weight solvent, about 5 percent by weight surfactant, and about 5 percent by weight humectant.

15. A method of making an ink composition for use in a microelectromechanical system-based fluid ejector comprising:
    providing a solution comprising a solvent, a solvent-soluble dye, and a surfactant; and
    adding said solution to water under conditions effective to produce an ink composition which exhibits a stable liquid microemulsion phase at a first temperature and a second temperature higher than the first temperature wherein the first temperature is about 22° C. and the second temperature is between about 22° C. and about 60° C., and has a conductivity of at most about 200 μS/cm and a dielectric constant of at least about 60.

16. A method of making an ink composition for use in a microelectromechanical system-based fluid ejector comprising:
    providing a solution or dispersion comprising a dye or a pigment; and
    adding to said solution or dispersion an additive which comprises a material that enhances dielectric permittivity and/or reduces conductivity under conditions effective to produce an ink composition having a conductivity of at most about 200 μS/cm and a dielectric constant of at least about 60.

17. A method according to claim 16, wherein said additive is a co-solvent selected from the group consisting of ethylene glycol, diethylene glycol, glycerol, 1-methyl-2-pyrrolidinone, propylene carbonate, ethylene carbonate, N-acetyl ethanolainide, N-ethyl formamide, N-butylacetamide, formamide, N-propylpropanamide, N-ethylacetamide, N-methylpropanamide, and N-methylformamide.

18. A method according to claim 16, wherein said additive is in the form of a particle and comprises a material selected from the group consisting of latex, titanium dioxide, alumina, and silica.

19. A method according to claim 16, wherein said solution or dispersion is aqueous and said additive is a buffer selected from the group consisting of cyclohexylaminopropanesulfonic acid (CAPS), hydroxyethylpiperazine ethanesulfonic acid (HEPES), and hydroxyethylpiperazine propanesulfonic acid (HEPPS).

20. A method according to claim 16, wherein said solution or dispersion is aqueous and said additive is diglycine or triglycine.

21. A method according to claim 16, wherein said solution or dispersion is non-aqueous and said additive is selected from the group consisting of lecithin, lanolin, and linolenic acid.

22. A method according to claim 16, wherein said additive is present in the ink composition in an amount from about 0.05 to about 25 percent by weight.

23. A method according to claim 16, wherein said pigment is carbon black or a color pigment.

24. A method according to claim 16, wherein said solution or dispersion further comprises a surfactant.

* * * * *